United States Patent [19]

Doyle

[11] 4,250,869

[45] Feb. 17, 1981

[54] FIRE PLOW

[76] Inventor: Kenneth R. Doyle, Flynn St., Hughenden, Queensland 4821, Australia

[21] Appl. No.: 14,180

[22] Filed: Feb. 22, 1979

[51] Int. Cl.³ .............................................. F23C 5/00
[52] U.S. Cl. ............................. 126/271.2 R; 47/1.42; 47/1.44; 126/271.1
[58] Field of Search ................. 126/271.2 R, 271.2 A, 126/271.2 C; 37/98; 172/611; 47/1.42, 1.44; 111/6, 7

[56] References Cited

U.S. PATENT DOCUMENTS

| 933,986 | 9/1909 | Hosmer | 172/611 |
| 1,835,629 | 12/1931 | Bingham | 126/271.2 |
| 2,839,047 | 6/1958 | Davisson | 126/271.2 |
| 2,849,809 | 9/1958 | Chatin | 37/98 |
| 2,987,837 | 6/1961 | Rasmussen | 126/271.2 |
| 3,270,632 | 9/1966 | Shultz | 126/271.2 |

*Primary Examiner*—Samuel Scott
*Assistant Examiner*—G. Anderson
*Attorney, Agent, or Firm*—Schwartz, Jeffery, Schwaab, Mack, Blumenthal & Koch

[57] ABSTRACT

A fire plow has a share, V-shaped in plan, below a frame made for attachment behind a tractor, and a burner, fueled from a tank on the plow is provided at one end of an arm pivoted at its other end to the frame, so the burner can be swung to either side of the rear of the share for igniting grass which has been cleared to one side of the plow track, or to a raised position well above the ground when ignition of the grass is to be interrupted.

5 Claims, 2 Drawing Figures

FIRE PLOW

BACKGROUND OF THE INVENTION

This invention relates to a fire plow.

The general object of the invention is to provide an appliance which may be used to produce, very quickly, an effective fire break by plowing and also by burning grass or the like to either side of the plow track. Other objects which may be achieved in preferred embodiments of the invention are to provide such an appliance which is simple and economical to manufacture, in which the igniting of grass and other growth may be easily and conveniently controlled, and which is very sturdy, durable and trouble-free in operation.

Accordingly, the invention resides broadly in a fire plow of the type including a frame, means for mounting the frame behind a tractor, a plow share mounted below the frame and capable of forming a plow track or break, clearing grass and the like to both sides, wherein a burner arm is pivotally connected at one end to the frame, carries a burner at the other end, and is pivotally movable to bring the burner near to the ground at either side of the plow track or to an intermediate position clear of the ground, and means are provided for fueling the burner. The plow share is of V-shape in plan view and has a ballast tank, capable of being filled with water, between its rearwardly divergent sides. The burner arm is preferably pivotally movable by a handle connected thereto by a connecting rod having a series of stops, any selected one of which is releasably engageable with a restraining member which is such that the stop will be disengaged on the burner striking an obstacle to tension the connecting rod. Other features of the invention will become apparent from the following description.

BRIEF DESCRIPTION OF THE DRAWINGS

A preferred embodiment of the invention is shown in the accompanying drawings, wherein.

DESCRIPTION OF THE PREFERRED EMBODIMENT

Figure 1:
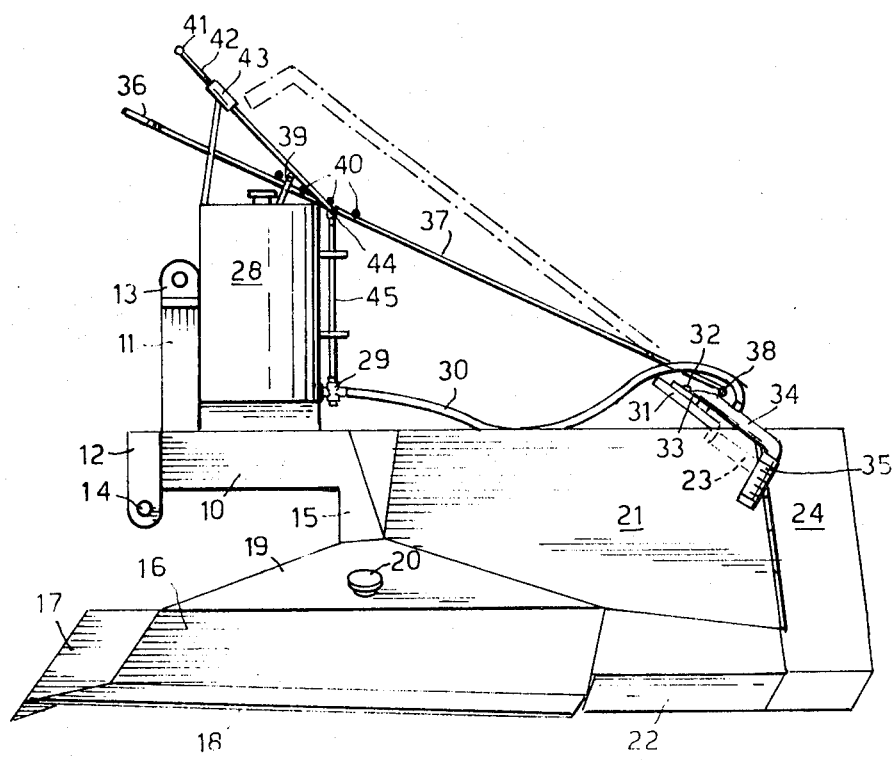
FIG. 1 is a side elevation of a fire plow according to the invention.
Figure 2:
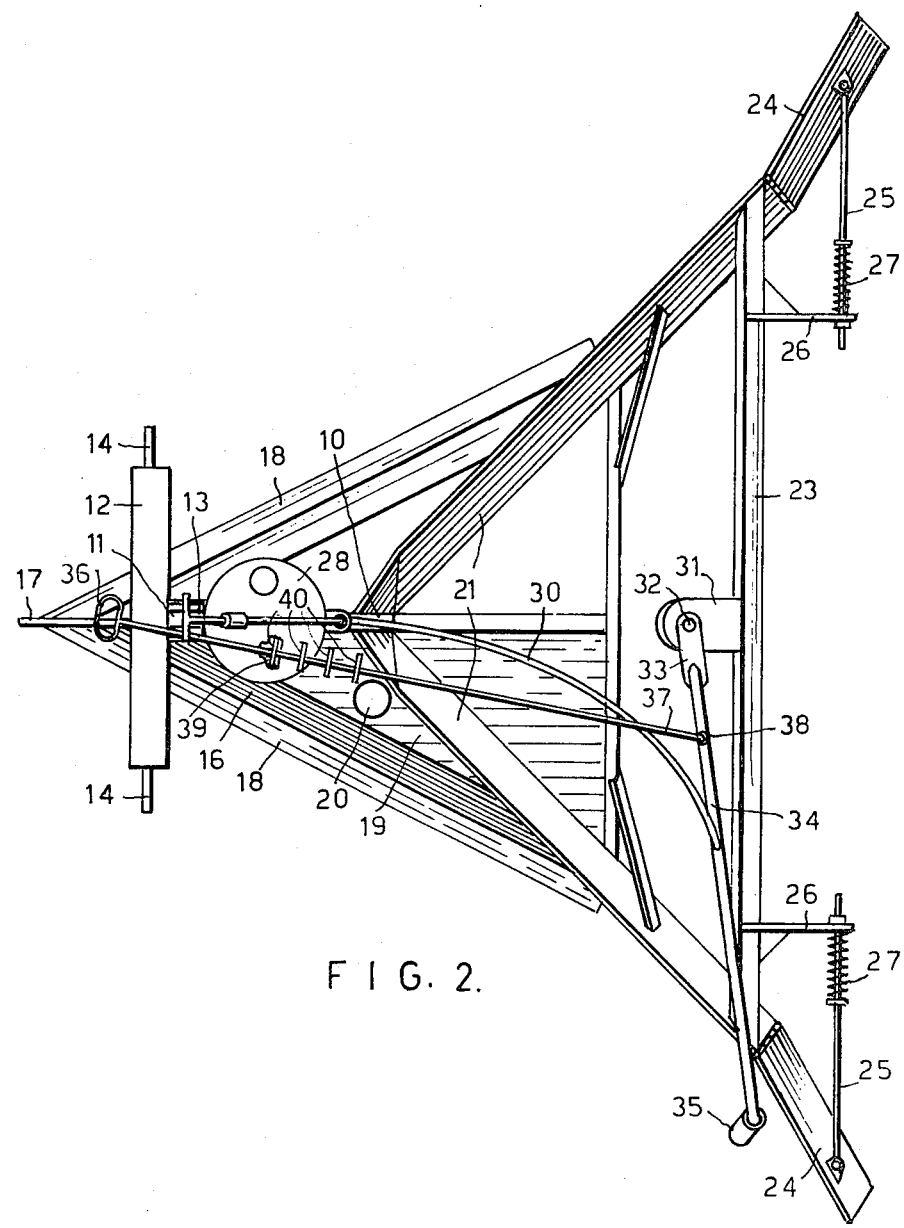
FIG. 2 is a plan view of the fire plow.

The plow illustrated includes a beam 10 to the front of which are secured a standard 11 and a cross-member 12, the standard being provided with apertured lugs 13, and the cross-member being provided at its ends with outwardly extending pins 14, for connection to the three-point lifting gear (not shown) of a tractor.

A post 15 extending downwardly from the beam 10 is secured rigidly to a plow share 16, which is substantially V-shaped in plan view, with a forwardly extending front end piece 17, and with outwardly inclined lower edge portions 18. Between the two arms of the V-shaped share 16, and around the lower part of the post 15, is a ballast tank 19, triangular in plan view, which may be filled with water through a filler inlet 20, and may be drained by a drainage outlet (not shown) in any convenient position.

A pair of rearwardly diverging wings 21 are secured to the post 15 and beam 10, and to the rear ends of the share 16. The rear parts of the wings 21 also have outwardly inclined lower edge portions as indicated at 22. A cross-bar 23 is secured between the upper rear parts of the wings 21.

Extensions 24 are hinged to the rear ends of the wings 21, and rods 25, pivoted to these extensions, slidable in brackets 26 on the cross-bar 23 and spring-loaded at 27, urge the extensions outwardly at a somewhat greater angle to the direction of travel than the wings 21.

When the appliance is in use, drawn by a tractor, it plows a break with windrows to either side, the windrows being about five feet between centres. At the same time, the fire plow is used to ignite grass to one side of the break. For this purpose, a tank 28 for liquid fuel, preferably a mixture of two parts of diesel oil to one part of gasoline, is mounted on the beam 10. The tank has an outlet through a control valve 29 to a flexible hose 30.

Mounted centrally on the cross-bar 23 is a pivot plate 31 inclining upwardly towards the front. Pivoted at 32 to the pivot plate 31 is a lug 33 secured to one end of a tubular burner arm 34 which is fitted at its downturned other end with a burner 35. The hose 30 is connected through the arm 34 to the burner 35. The burner arm 34, with the burner 35, may be swung to one side or the other of the implement, the inclination of the pivot plate 31 being such that the burner arm will clear the tank 28 and other parts of the implement during such movement, or the burner arm may be brought up to a central or neutral position as indicated in broken outline in FIG. 1. The burner arm may be swung to any such position by means of a handle 36 on the front end of a pull rod 37 which at its rear end is connected through a swivel 38 to the burner arm 34. The pull rod 37, when not being used to move the burner arm, is supported by a fork 39 on the tank 25. A series of stops 40 are fixed across the pull rod 37, which is releasably engaged in the fork 39 with any selected stop 40 against the fork to hold the burner arm 34 in desired adjusted position. If, as the implement is advanced, the burner 35 should be brought up to a substantial obstacle, the stop 40 against the front of the fork 39 will ride up the inclined fork to cause the pull rod 37 to be disengaged therefrom, so that the burner arm may swing back without sustaining damage.

The control valve 29 may be adjusted as from time to time required, or closed, by means of a handle 41 at the front of a shaft 42 rotatable in a bearing 43 mounted above the tank 28 and connected by a universal coupling 44 to the spindle 45 of the control valve.

The driver of the tractor to which the fire plow is connected may, without leaving his seat, bring the burner 35 quickly and easily to appropriate position for igniting grass to either side of the ploughed break or to a raised position when it is desired to interrupt the ignition of the grass at the edge of the plough track, and may at any time adjust the flow of fuel to the burner.

I claim:

1. A fire plow of the type including a frame, means for mounting the frame behind a tractor, and a plow share mounted below the frame and capable of forming a plow track or break for clearing grass and the like to both sides of the plow share, said plow share having two sides rearwardly divergent from a front point and a pair of wing members mounted above and extending behind said plow share, said wing members being rearwardly divergent and inclined toward the top, a burner arm pivotally connected at one end to the frame and carrying a burner at the other end thereof, said burner arm being pivotally movable to bring the burner near to the ground at either side of the plow track or to an intermediate raised position clear of the ground, and fuel supply means mounted on the frame for supplying fuel to the burner.

2. A fire plow according to claim 1 further including a ballast tank mounted between the sides of the plow share for receiving a quantity of water.

3. A fire plow of the type including a frame, means for mounting the frame behind a tractor, and a plow share mounted below the frame and capable of forming a plow track or break for clearing grass and the like to both sides of the plow share, a burner arm pivotally connected at one end to the frame and carrying a burner at the other end, said burner arm being pivotably connected to the middle rear part of the plow about an axis inclining upwardly towards the rear, a pull rod, with a handle at its front, connected by a swivel at its rear to said burner arm, said pull rod being formed with a series of stops, any selected one of said stops being releasably engageable with a restraining member on the plow to hold said burner arm in a desired position, said restraining member being such that a stop engaged therewith is disengageable by force applied in a rearward direction to the burner arm, and fuel supply means mounted on said frame for supplying fuel to said burner.

4. A fire plow according to claim 3 wherein said plow share has two sides rearwardly divergent from a front point, and a ballast tank mounted between the sides of the plow share for receiving a quantity of water.

5. A fire plow according to claim 4 further including a pair of wing members mounted above and extending behind the plow share, said wing members being hinged to said sides and being rearwardly divergent and inclined outwardly towards the top.

* * * * *